United States Patent Office 3,513,129
Patented May 19, 1970

3,513,129
SYNTHETIC POLYAMIDES
David E. Kramm, Laurel, Md., assignor to W. R. Grace &
Co., New York, N.Y., a corporation of Connecticut
No Drawing. Filed Dec. 5, 1967, Ser. No. 687,977
Int. Cl. C08g 9/16
U.S. Cl. 260—72    9 Claims

ABSTRACT OF THE DISCLOSURE

A solid synthetic polyamide is formed by the reaction of one molar proportion of nitrilo-tris-acetonitrile with about 2 molar proportions of formaldehyde and one molar proportion of a monofunctional organic nitrile in the presence of an acid catalyst and water. Copolymers may also be made by utilizing a dinitrile as an additional ingredient in the reaction. Some of the products are water-soluble and other are water-insoluble.

---

The present invention relates to a novel and useful polyamide and a process for preparing it. More particularly, it relates to a solid synthetic polyamide formed by the reaction of nitrilo-tris-acetonitrile with formaldehyde and a monofunctional organic nitrile.

Synthetic linear polyamides are well known in the art and have received widespread acceptance in the art. In the present invention it is an object to provide a new and useful class of polyamides. Another object is to provide a polyamide which is suitable as a water-soluble adhesive. A still further object is to provide a polyamide which is useful as a molding resin. A further object is to provide a polyamide which can be made from relatively inexpensive starting materials. Other objects will become apparent as the description of the invention proceeds.

These objects are accomplished by the present invention which provides a solid synthetic polyamide selected from the group consisting of (1) a polyamide containing the recuring structural unit

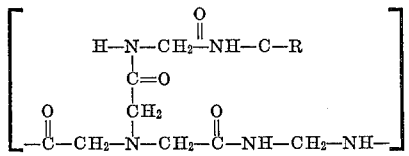

wherein R is an organic radical and (2) acids salts thereof.

In a preferred embodiment of the present invention, the R is a substituted or unsubstituted organic radical containing from 1 to about 12 carbon atoms.

The present invention also provides a process for forming a solid synthetic polyamide which comprises reacting one molar proportion of nitrilo-tris-acetonitrile with from about 1.7 to about 2.30 molar proportions of formaldehyde and about 0.85 to about 1.15 molar proportions of a mono-functional organic nitrile in the presence of an acid catalyst and water and thereafter recovering the polyamide which is formed.

In a preferred embodiment of the present invention, the reaction is carried out at a temperature of from about 0° C. to about 50° C., more preferably from about 5° C. to about 15° C., and the acid catalyst is sulfuric acid.

The reaction of the nitrilo-tris-acetonitrile with formaldehyde and the monofunctional organic nitrile proceeds as follows.

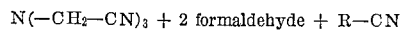

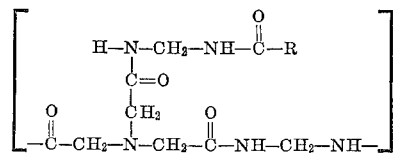

About plus or minus 15% of the formaldehyde or the specified mononitrile may be utilized in the reaction to obtain the polyamide.

When a dinitrile is used to make copolyamides, the dinitrile reacts so as to go into the chain of the polyamide. In forming such copolymers, additional formaldehyde and water must be used for reacting with dinitrile. Among the various dinitriles which may be used in the practice of the present invention are adiponitrile, o-, p- and m-phthalonitrile, succionitrile, imino-diacetonitrile, 3,3'-thiodipropionitrile, glutaronitrile, malononitrile, sebaconitrile and the like.

The acids which may be used to form the "acid salts" of the polyamide are the various weak and strong inorganic and organic acids. Such acids include sulfuric acid, hydrochloric acid, formic acid, boric acid, benzoic acid, chloroacetic acid, para-nitrobenzoic acid, oxalic acid and the like. The salts of the stronger acid will form in aqueous solutions and can be precipitated therefrom. In forming the salts of the weaker acids, the solutions are generally evaporated to dryness to drive the reaction towards the salt formation.

The expression "monofunctional organic nitrile" includes any compound having the formula R-CN wherein R is an organic radical. Among the various nitriles which may be utilized in the practice of the invention are 4-methyl-n-valeronitrile, phenylacetonitrile, n-valeronitrile, acetonitrile, propionitrile, hydracrylonitrile, chloroacetonitrile, lactonitrile, methacrylonitrile, (p- and o-methoxyphenyl) acetonitrile, p- and o-chlorobenzonitrile, o- and p-tolunitrile, nicotinonitrile, isonicotinonitrile, 1-napthonitrile, m- and p-nitrobenzonitrile, p-aminobenzonitrile, 4-biphenylcarbonitrile, anisonitrile and the like.

The "acid catalyst" which may be used for the reaction includes hydrochloric acir, sulfuric acid, formic acid, para-toluene sulfonic acid, monochloroacetic acid and the like. Mixtures of such acids may also be used in the catalyst system.

In general, the reaction may be run at temperatures up to 70–100° C. but at the elevated temperatures the polymer tends to be discolored which is objectionable in some instances. Accordingly, it is preferred to run the reaction at temperatures below about 50° C. preferably 5 to 15° C. An ice bath serves as a very convenient cooling medium to maintain the reactants at a temperature of 10° C. to 20° C.

The "formaldehyde" employed in the present invention can be monomeric or polymeric and the term includes all such forms. Thus, formaldehyde, paraformaldehyde or trioxane can be used. For convenience trioxane is generally employed since it is easily handled and measured.

The following examples are given to illustrate the invention and are not intended to limit it in any manner. All parts are given in parts by weight unless otherwise expressed.

EXAMPLE 1

A three liter, four neck round bottom flask is equipped with a high speed stirrer in one neck and a reflux condenser in the second neck. Into the third neck is inserted a thermometer which extends nearly to the bottom of the flask and an inlet dropping funnel is placed in the fourth neck. The reflux condenser is removed and 300 ml. of 90% formic acid is added to the flask along with the following:

| Condensation monomer | M.W. | Moles cpd. | Grams cpd. | Milli-equiv-alents |
|---|---|---|---|---|
| Nitrilo-tris-acetonitrile | 134.15 | 0.30 | 40.245 | 900 |
| Acrylonitrile | 53.06 | 0.30 | 15.918 | 300 |
| Trioxane | 90.08 | 0.20 | 18.016 | 1,200 |

The flask is immersed in an ice bath and chilled to 10° C. 150 ml. of concentrated sulfuric acid is added in small increments over a period of 50 minutes to keep the temperature in the range 10° C. to 15° C. The ice bath is removed and the reaction is allowed to proceed an additional 30 minutes during which time the temperature gradually rises to 23° C. 150 ml. of distilled water is gradually added to the flask while cooling the flask in an ice bath to keep the temperature below 23° C. The viscous reaction mixture is then slowly poured into 1750 ml. of rapidly stirred dry methanol in a 2 liter beaker. A solid taffy-like material agglomerates and is removed from the liquid which is discarded. The polyamide is redissolved in 100 ml. of distilled water and reprecipitated by pouring it into 1750 ml. of rapidly stirred methanol. The taffy-like mass is removed and broken up in a fresh batch of 500 ml. of methanol. The polyamide is then filtered and vacuum dried. The vacuum oven is at 70° C. and 100 mm. of Hg with a slow sweep of dry air through the oven.

The polyamide as the bisulfate salt, is a white, free flowing powder which is water-soluble. The yield is 80 g. The product becomes very sticky when moist and is useful as a water-soluble adhesive. In this example, the R group is —CH=CH₂.

The polyamide can be molded with curing at 365° F. to give a substantially transparent, water white article which is water-insoluble. The cured polyamide is flame retardant and self-extinguishing.

EXAMPLE 2

A three liter, four neck round bottom flask is equipped with a high speed stirrer in one neck and a reflux condenser in the second neck. Into the third neck is inserted a thermometer which extends nearly to the bottom of the flask and an inlet dropping funnel is placed in the fourth neck. The reflux condenser is removed and 100 ml. of 90% formic acid is added to the flask along with the following:

| Condensation monomer | M.W. | Moles cpd. | Grams cpd. | Milli-equiv-alents |
|---|---|---|---|---|
| Nitrilo-tris-acetonitrile | 134.15 | 0.200 | 26.828 | 600 |
| Trioxane | 90.08 | 0.140 | 12.611 | ¹ 840 |
| Chloroacetonitrile | 75.49 | 0.200 | 15.098 | 200 |

¹ 5% excess.

The flask is immersed in an ice bath and chilled to 5° C. 50 ml. of concentrated sulfuric acid is added in small increments over a period of 15 minutes to keep the temperature in the range 5° C. to 10° C. 3 ml. of water are then added to the reaction mixture. The ice bath is removed and the reaction is allowed to proceed an additional 45 minutes during which time the temperature gradually rises to 23° C.

The viscous reaction mixture is then slowly poured into 1500 ml. of rapidly stirred methanol in a 2 liter beaker. A powdery solid separates from the liquid. The polyamide is recovered by filtration and vacuum dried as in Example 1.

The polyamide, as the bisulfate, salt, is a very white, free flowing, water-soluble powder. When moistened it becomes very sticky and is useful as a water-soluble adhesive. In this example, the R group is —CH₂Cl.

EXAMPLE 3

A three liter, four neck round bottom flask is equipped with a high speed stirrer in one neck and a reflux condenser in the second neck. Into the third neck is inserted a thermometer which extends nearly to the bottom of the flask and an inlet dropping funnel is placed in the fourth neck. The reflux condenser is removed and 100 ml. of 90% formic acid is added to the flask along with the following:

| Condensation monomer | M.W. | Moles cpd. | Grams cpd. | Milli-equiv-alents |
|---|---|---|---|---|
| Nitrilo-tris-acetonitrile | 134.14 | 0.200 | 26.828 | 600 |
| 2-cyanoacetamide | 84.08 | 0.200 | 16.816 | 200 |
| Trioxane | 90.08 | 0.140 | 12.611 | ¹ 840 |

¹ 5% excess.

The flask is immersed in an ice bath and chilled to 5° C. 50 ml. of concentrated sulfuric acid is added in small increments over a period of 15 minutes to keep the temperature in the range 5° C. to 10° C. 2 ml. of water are then added to the reaction mixture. The ice bath is removed and the reaction is allowed to proceed an additional 45 minutes during which time the temperature gradually rises to 23° C. The viscous reaction mixture is then slowly poured into 1500 ml. of rapidly stirred dry methanol in a 2 liter beaker. A powdery solid separates from the liquid. The polyamide is recovered by filtration and vacuum dried as in Example 1.

The polyamide, as the bisulfate salt, is a very white, free flowing, water-soluble powder. When moistened it becomes very sticky and is useful as a water-soluble adhesive. In this example, the R group is

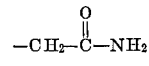

EXAMPLE 4

A three-liter, four neck, round bottom flask is equipped with a high speed stirrer in one neck and a reflux condenser in the second neck. Into the third neck is inserted a thermometer which extends nearly to the bottom of the flask and an inlet dropping funnel is placed in the fourth neck. The reflux condenser is removed and 300 ml. of 90% formic acid is added to the flask along with the following:

| Condensation monomer | M.W. | Moles cpd. | Grams cpd. | Milli-equiv-alents |
|---|---|---|---|---|
| Nitrilo-tris-acetonitrile | 134.15 | 0.300 | 40.245 | 900 |
| Trioxane | 90.09 | 0.20 | 18.016 | 1,200 |
| Benzonitrile | 103.12 | 0.30 | 30.936 | 300 |

The flask is immersed in an ice bath and chilled to 10° C. 150 ml. of concentrated sulfuric acid is added in a small increments over a period of 1 hour to keep the temperature in the range 10° C. to 15° C. The ice bath is removed and the reaction is allowed to proceed with an additional 65 minutes during which time the temperature gradually rises to 22° C. 150 ml. of distilled water is slowly added to the reaction mixture. The viscous reaction mixture is then slowly poured into 2500 ml. of rapidly stirred dry methanol in a 3 liter beaker. A powdery solid forms and it is separated from the liquid by filtration. The polyamide is then transferred to a second 3 liter beaker containing 1200 ml. of dry methanol. It is stirred for 15 minutes and then filtered and vacuum dried as in Example 1.

The polyamide, as the bisulfate salt, is a very white, free flowing, water-insoluble powder. The polyamide is useful as a thermoplastic molding resin. The product when molded at 140° C. is transparent and has a density of 1.463 gm. per cubic centimeter. Products produced from the polyamide are flame retardant and exfoliate upon ignition. In this example, the R group is the phenyl radical.

EXAMPLE 5

The water-soluble polyamide of Example 1 (in the form of the bisulfate salt) is dissolved in distilled water. 10 g. of polymer dissolves in 80 ml. of water to form an acidic solution which is neutralized to phenolphthalein (ph 8.2) by a 10% potassium hydroxide aqueous solution. 200 ml. of methanol is added to the aqueous solution to precipitate the potassium sulfate salt from the mixture. The mixture is filtered to remove the salt. To the filtrate is then added 900 ml. of isopropanol which precipitates the polyamide as the free base. The polyamide is recovered by decanting the liquid and freeze drying the remaining moisture from the polyamide. The conditions for freeze drying were −40° C. and a vacuum of 758 mm. of Hg.

The polyamide, as the free base, is a free flowing, white powder which is water-soluble and contains vinyl linkages. When the polyamide is molded in a press at 365° C., it cures to give a tough, transparent, slightly yellow product. The polyamide upon curing is water insoluble.

EXAMPLE 6

In order to demonstrate that copolymers of the polyamide can be formed, a dinitrile is utilized with the mononitrile. The three liter four neck round bottom flask is equipped with a high speed stirrer in one neck and a reflux condenser in the second neck. Into the third neck is inserted a thermometer which extends nearly to the bottom of the flask and an inlet dropping funnel is placed in the fourth neck. The reflux condenser is removed and 100 ml. of 90% formic acid is added to the flask along with the following:

| Condensation monomer | M.W. | Moles cpd. | Grams cpd. | Milli-equivalents |
|---|---|---|---|---|
| Nitrilo-tris-acetonitrile | 134.14 | 0.200 | 26.828 | 600 |
| Trioxane | 90.08 | 0.210 | 18.917 | [1] 1,260 |
| o-Phthalonitrile | 128.13 | 0.200 | 25.626 | 400 |
| Acetonitrile | 41.05 | 0.200 | 8.200 | 200 |

[1] 5% excess.

The flask is immersed in an ice bath and chilled to 2° C. 50 ml. of concentrated sulfuric acid is added in small increments over a period of 15 minutes to keep the temperature in the range 4° C. to 10° C. 2 ml. of water is then added to the reaction mixture. The ice bath is removed and the reaction is allowed to proceed an additional 40 minutes during which time the temperature gradually rises to 20° C. The viscous reaction mixture is then slowly poured into 1500 ml. of rapidly stirred dry methanol in a 2 liter beaker. A powdery solid separates from the liquid. The copolyamide is separated by filtration. It is then reslurried in 500 ml. of fresh dry methanol, refiltered and then vacuum dried as in Example 1.

The copolyamide, as the bisulfate salt, is a white, free flowing, water-soluble powder. When moistened it becomes very sticky and is useful as a water-soluble adhesive. The yield is 78.8 g. In this example, the R group is —CH₃.

EXAMPLE 7

When Example 4 is repeated employing an equivalent amount of 2,4-diethylbenzonitrile instead of benzonitrile, substantially the same results are obtained.

While in the above examples unmodified polyamides are prepared, it is obvious that dyes, pigments, fillers and the like may be added to the polyamide without substantial alteration of the physical properties.

Some of the polyamides produced in accordance with the present invention are water-soluble and are useful as adhesives, textile sizings, ceramic binders, water-treating agents, paper coatings and the like. Others are water-insoluble and are useful as adhesives, molding resins, castings resins and the like.

Many equivalent modifications will be apparent to those skilled in the art from a reading of the foregoing without a departure from the inventive concept.

What is claimed is:

1. A solid synthetic resinuous polyamide selected from the group consisting of (1) a polyamide consisting of the recurring structural unit

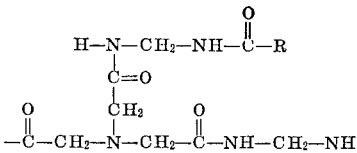

prepared by reaction of formaldehyde with nitrilo-tris-acetonitrile and with a monofunctional organic nitrile RCN selected from the group consisting of 4-methyl-n-valeronitrile, phenylacetonitrile, n-valeronitrile, acetonitrile, propionitrile, hydracrylonitrile, chloroacetonitrile, lactonitrile, methacrylonitrile, (p- and o-methoxyphenyl)-acetonitrile, p- and o-chlorobenzonitrile, o- and p-tolunitrile, nicotinonitrile, isonicotinonitrile, 1-naphonitrile, m- and p-nitrobenzonitrile, p-aminobenzonitrile, 4-biphenylcarbonitrile, anisonitrile and (2) the bisulfate salts thereof.

2. The solid synthetic polyamide of claim 1 wherein R is the —CH=CH₂ radical.

3. The solid synthetic polyamide of claim 1 wherein R is the phenyl radical.

4. The solid synthetic polyamide of claim 1 wherein R is the —CH₂Cl radical.

5. The solid synthetic polyamide of claim 1 wherein R is the

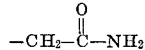

radical.

6. The solid synthetic polyamide of claim 1 wherein R is the —CH₃ radical.

7. A process for forming a solid, synthetic resinous polyamide which comprises reacting one molar proportion of nitrilo-tris-acetonitrile with from about 1.7 to about 2.30 molar proportions of formaldehyde and with 0.85 to about 1.15 molar proportions of a monofunctional organic nitrile in the presence of 50 ml. to 150 ml. concentrated sulfuric acid catalyst and 100 ml. to 300 ml. of 90% formic acid in water per 0.2 to 0.3 mole of nitrilo-tris-acetonitrile and thereafter recovering the polyamide which is formed.

8. The process of claim 7 wherein the reaction is carried out at a temperature of from about 0° C. to about 50° C.

9. The process of claim 7 wherein the reaction is carried out at a temperature of from about 5° C. to about 15° C.

References Cited

UNITED STATES PATENTS 2,228,271  1/1941  Jacobson et al. _____ 260—72
2,537,689  1/1951  Wowry et al. _____ 260—72

HAROLD D. ANDERSON, Primary Examiner

R. J. KOCH, Assistant Examiner

U.S. Cl. X.R.

117—161; 260—29.4